United States Patent [19]

Murphy

[11] Patent Number: 5,297,232
[45] Date of Patent: Mar. 22, 1994

[54] WIRELESS NEURAL NETWORK AND A WIRELESS NEURAL PROCESSING ELEMENT

[75] Inventor: John H. Murphy, Churchill Boro., Pa.

[73] Assignee: Westinghouse Electric Corp., Pittsburgh, Pa.

[21] Appl. No.: 785,393

[22] Filed: Oct. 30, 1991

[51] Int. Cl.$^5$ .............................................. G06F 15/18
[52] U.S. Cl. ...................................................... 395/24
[58] Field of Search ......................... 395/24, 22, 25, 27

[56] References Cited

U.S. PATENT DOCUMENTS

| | | | |
|---|---|---|---|
| 4,809,193 | 2/1989 | Jourjine | 395/25 |
| 4,823,136 | 4/1989 | Nathanson et al. | 342/368 |
| 4,988,891 | 1/1991 | Mashiko | 395/25 |
| 4,996,648 | 2/1991 | Jourjine | 395/25 |
| 5,121,231 | 6/1992 | Jenkins et al. | 395/25 |
| 5,150,242 | 9/1992 | Fellows | 395/25 |
| 5,167,007 | 11/1992 | Toyoda | 395/25 |
| 5,180,911 | 1/1993 | Grossman et al. | 395/22 |

FOREIGN PATENT DOCUMENTS

| | | | |
|---|---|---|---|
| 0411341 | 2/1991 | European Pat. Off. | 395/24 |
| 0443208 | 8/1991 | European Pat. Off. | 395/24 |

OTHER PUBLICATIONS

Intel Corporation, 1990, 80170NW Electrically Trainable Analog Neural Network.
Intel Corporation, 1989, An Electrically Trainable Artificial Neural Network (ETANN) with 10240 "FLoating Gate" Synapses.
Design, Fabrication and Evaluation of a 5-inch Wafer Scale Neural Network LSI Composed of 576 Digital Neurons, pp. 527–535.
Carver Mead, Analog VLSI and Neural Systems, pp. 90–96.
Nabil H. Farhat, Applied Optics, Dec. 1, 1987, vol. 26, No. 23, "Optoelectronic analogs of self-programming neural nets: architecture and methodologies for implementing fast stochastic learning by simulated annealing" pp. 5093–5104.

*Primary Examiner*—Allen R. MacDonald
*Attorney, Agent, or Firm*—M. P. Lynch

[57] ABSTRACT

A neural network is disclosed in which communication between processing elements occurs by radio waves in a waveguide. Radio-wave communication using common carrier signals by transceivers in a waveguide allows processing elements to communicate wirelessly and simultaneously. Each processing element includes a radio frequency transceiver and an accompanying antenna which performs the neuron summing operation because input signals simultaneously received from plural processing elements by the antenna add. The weights on each input are provided by different spatial relationships between the transmitting processing elements and the receiving processing element which causes signal strength loses through the waveguide to be different. Each receiving processing element performs a neural threshold or sigmoid operation on the summed signal received from the transceiver and then a strength (amplitude scaling) can be applied to the output before the processing element transmits that output to the other processing elements in the system. Processing elements are grouped, allowing one group to transmit while the other group is receiving. Wafer scale electronics including transceivers and analog processing elements are combined with a comparably sized waveguide to produce a compact device.

18 Claims, 11 Drawing Sheets

| A-B INFLECTION POINTS | |
|---|---|
| ○ | NULL |
| △ | NEGATIVE |
| □ | POSITIVE |

WIRELESS NEURAL NETWORK AND A WIRELESS NEURAL PROCESSING ELEMENT

BACKGROUND OF THE INVENTION

1. Field of the Invention

The present invention is directed to a neural network in which communication between plural processing elements is accomplished simultaneously, and wirelessly, by communicating via electromagnetic waves and, more particularly, to a neural network in which each processing element includes a radio frequency transceiver receiving common carrier outputs from other neural processing elements and transmitting thresholded or non-linearly transformed common carrier outputs to other processing elements via a waveguide which spatially weights the signals between the processing elements.

2. Description of the Related Art

Conventional neural networks communicate to each other via dedicated or shared connections between processing elements. In the dedicated type in which an individual wire connection exists between each processing element, the number of connections and wires grows rapidly as the number of processing elements grow. The number of connections required for a two-layer fully connected network is $N^2$ where N is the number of processing elements per layer. When a network has a large number of processing elements, such as 1,000, a dedicated connection arrangement, requiring 1,000,000 wires, becomes impractical both physically and economically. One solution to the connection problem is to have the processing elements share one or more buses. However, since each processing element must occupy the bus to which it is connected, during a dedicated time period in each computation cycle, the speed of a system with a large number of processing elements can be very slow.

There are numerous approaches to the neural network processing performed by each processing element (neuron). Most are based on the very simple and conventional algorithm or transfer function, $$Y_j = \left( \sum_i W_{ij} X_i > \theta_j \right) \quad (1)$$

where $Y_j$ is the output from the j-th processing element, $X_i$ is the output from the i-th neuron, $W_{ij}$ is the weight of the connection between processing element i and processing element j, and $\theta_j$ is the threshold level for neuron j. This algorithm simply determines that the output from a processing element is to be activated if the weighted summation of the inputs to this processing element is greater than some pre-defined threshold. This algorithm, (and related variants) has been the center of neural research for over forty years because it is a simple mathematical model of what is believed to take place within nervous tissue. Teaching neural networks which have such a conventional algorithm to perform some desired transformation is also well known. What is needed is a neural network connection arrangement that allows large numbers of processing elements to communicate very rapidly with each other and which sufficiently conforms to the traditional way of performing neural processing element operations allowing conventional teaching methods to be used to the best advantage.

SUMMARY OF THE INVENTION

It is an object of the present invention to provide a communication apparatus that allows a large number of neural processing elements to communicate simultaneously with each other.

It is another object of the present invention to provide a network in which a higher density of processing elements is achievable because physical linkages, which occupy integrated circuit space, are eliminated and because a substantial portion of the neural computation is performed electromagnetically again reducing the space required.

It is an additional object to reduce the production cost and increase the reliability of a neural network by eliminating a substantial number of hardwired connections.

It is also an object of the present invention to provide a connection method in which conventional teaching algorithms can be used.

It is a further object of the present invention to provide a network which communicates between processing elements via radio waves in a waveguide.

It is an additional object of the present invention to allow fully connected networks of large numbers of neurons to be practically and economically implemented.

The above objects can be attained by a system in which communication between neural processing elements occurs by radio waves in a waveguide. Each processing element includes a radio frequency transceiver and antenna where a receiving processing element performs the conventional neural processing element summing operation because input signals simultaneously received from plural processing elements by an antenna add and the weights on each input are provided by the geometry and properties of the waveguide between the transmitting processing elements and the receiving processing element. Each receiving processing element performs a threshold operation or non-linear transformation and then a weight or amplitude scaling can be applied to the output before the processing element transmits that output to the other processing elements in the system.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
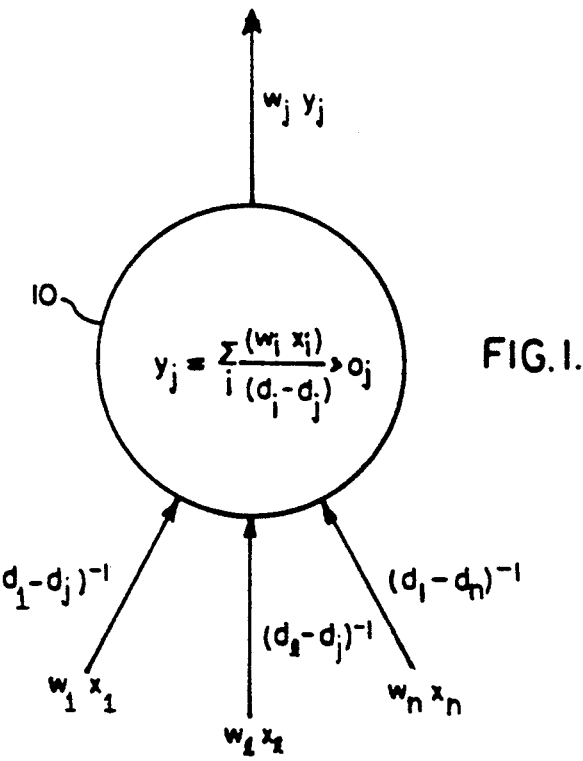
FIG. 1 illustrates a neural processing element 10 in accordance with the present invention.

The present invention uses the physics of electromagnetic communication to expedite neural network processing, while minimizing the resources needed to perform the processing by communicating between processing elements electromagnetically using radio waves. Electromagnetic communication between processing elements or neurons is governed by Maxwell's equations. If more than one processing element is communicating at the same frequency, the total signal at any one physical location is the sum of all signals reaching that location. That is, an antenna at a location receives the sum of all signals. Maxwell's equations dictate that the signal strengths of the individual signals received at the location of a receiver antenna are inversely scaled by the distance between the transmitters and receiver before summation occurs. That is, two signals broadcast at the same strength at different distances from the receiver location arrive at the receiver location with different strengths. This summation process and scaling process is used by the present invention as a means of performing some of the neural network processing algorithm, that is, a portion of the weighting operation and the entire summation operation. However, the processing algorithm is different than the classical neural network processing algorithm of equation (1). The Maxwell neural network processing algorithm of the present invention is given by the following equation:

$$Y_j = \left( \sum_i \frac{(W_i X_i)}{(d_j - d_i)} > \theta_j \right) \quad (2)$$

where $Y_j$ is the output from the j-th processing element, $X_i$ is the output from the i-th processing element, $W_i$ is the transmitter amplitude of the connections from processing element i, $d_i$ is the distance in some frame of reference to the transmitter for processing element i, $d_j$ is the distance in the same frame of reference to the receiver for processing element j, and $\theta_j$ is the threshold level for processing element j. This algorithm determines that the output from a processing element is to be fired (produced) if the scaled and weighted summation of the inputs to this processing element is greater than some pre-defined threshold. A processing element 10 using this approach to neural processing is illustrated in FIG. 1. In some ways, this processing configuration is similar to the "outstar neuron" developed by Stephen Grossberg and described in "Classical and Instrumental Learning by Neural Networks," Progress In Theoretical Biology, 3, 51-141 (1974) incorporated by reference herein. However, the specific details are different.

Equation (2) is very similar to the ordinary neural network processing equation (1). If one substitutes for $W_{ij}$ in equation (1) the quantity $W_i/(d_j-d_i)$, we have what appears to be identical equations. But in any fixed physical system, such as described herein, the distances $d_j$ and $d_i$ are not variables that can be arbitrarily adjusted. This means that the associated weight, $w_{ij}$, cannot take on any arbitrary value as in the original neural network equation (1). This makes these two equations quite different. Equation (2) can be rewritten as $$Y_j = (\Sigma a_{ij} w_i x_i > \theta_j) \quad (3)$$

where $a_{ij}$ is the set of predefined multipliers, defined by the spatial geometry of the network and $w_i$ is the output strength applied by the element i to the signal produced by that element. Equation (3) shows the difference between equations (1) and (2) more clearly. The Maxwell neural network processing algorithm has control only on the output strength from an element ($w_j$ shown in FIG. 1) not on the input weights to an element node. This means that there are fewer controllable weights (i strengths versus i times j weights) between processing elements. This limitation in the weights limits the representational capability. Nevertheless, networks with large numbers of elements can be formulated to solve any arbitrary problem using this algorithm in the same way that networks of classical neurons can be formed to solve any arbitrary problem. The algorithm or transfer function of equation (3) can be also implemented using a sigmoid transfer function rather than the threshold function explicitly required in equation (3) by appropriately setting the crossover or rise point of the sigmoid curve.

Figure 3:
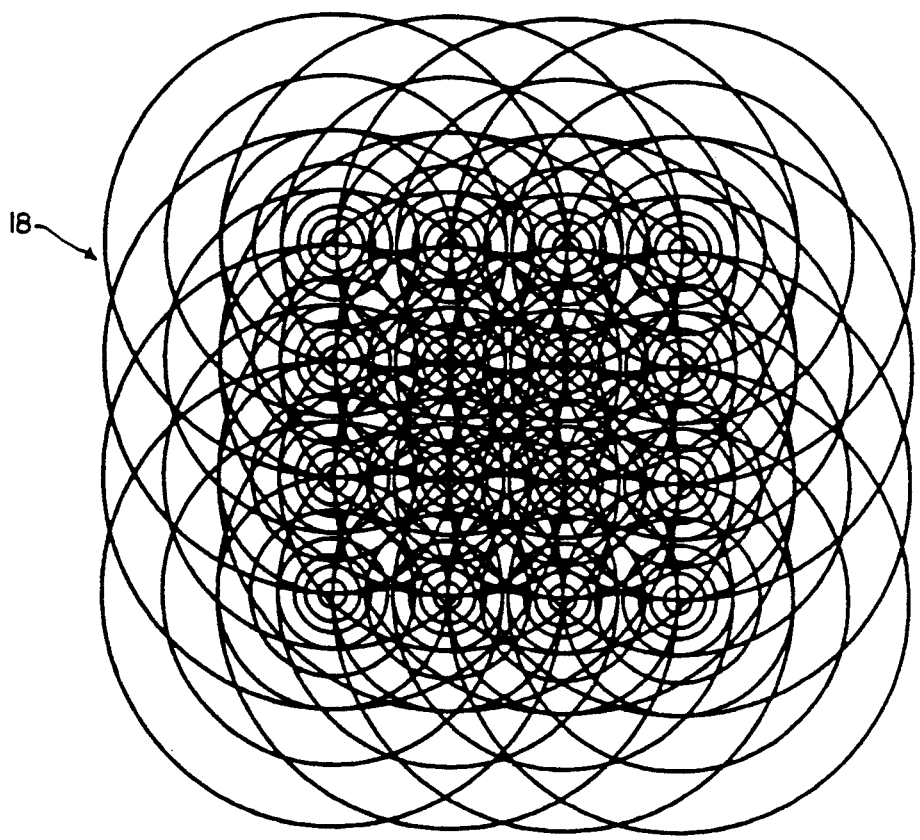
FIG. 3 illustrates the communication between the processing elements of FIG. 2.
Figure 2:
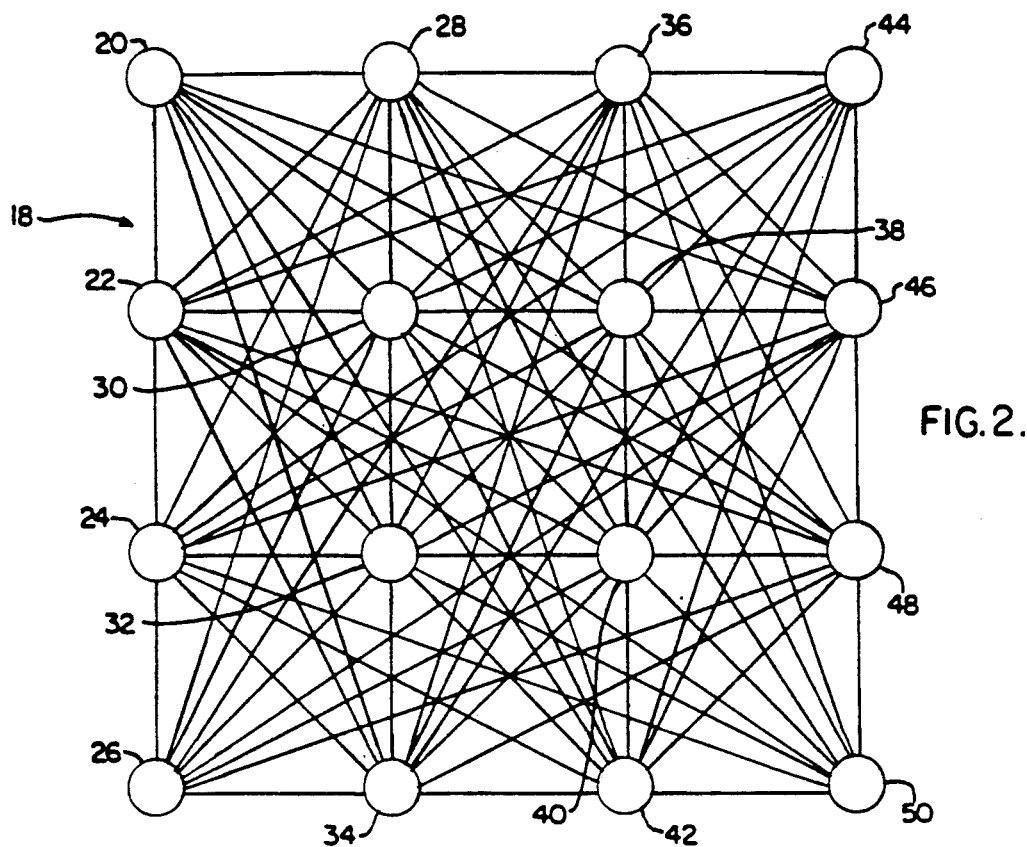
FIG. 2 depicts a 4 by 4 array 18 of fully or completely connected neural processing elements.

The electromagnetically based neural network element of FIG. 1 provides global communications between processing elements rather than the local communications which occur in prior art systems. FIG. 2 illustrates a fully or completely connected neural network of 16 processing elements 20-50. FIG. 3 shows how a fully connected neural network, as illustrated in FIG. 2, communicates using the electromagnetically based neural network processing element of FIG. 1. As can be seen in this figure, all of the processing elements 20-50 are capable of communicating to each other simultaneously.

Figure 4:
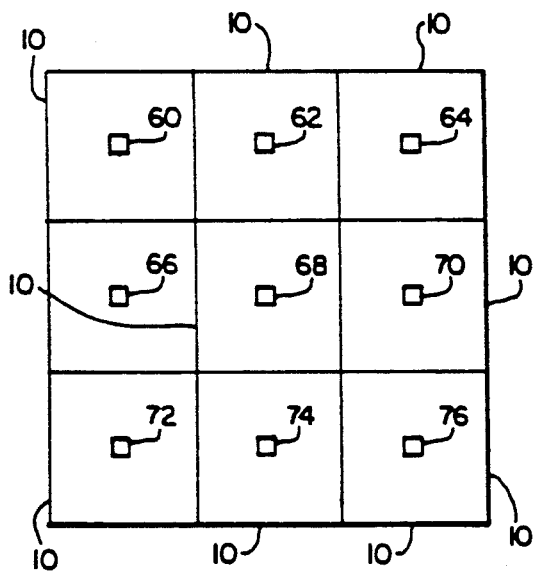
FIG. 4 illustrates a regular array of antennas for the neural processing elements of FIG. 1.
Figure 5:
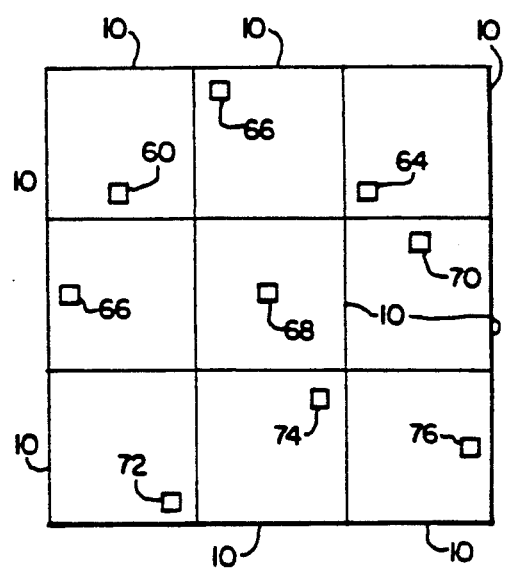
FIG. 5 depicts an irregular array of antennas that allows variable spatial weights.

The processing elements 10 of the present invention preferably communicate using radio frequency transmission and reception, so that radio frequency transmitters and receivers along with appropriate antennas are provided. The details of such components will be discussed later herein. If the antennas 60–76 for an array of processing elements 10 are arranged regularly as illustrated in FIG. 4, the Maxwell neural network processing algorithm has control only on the output strength from a processing element not on the input weights to a processing element because the distances between antennas are regular. That is, the distance of processing element 68 from processing elements 66 and 70 is the same and, as a consequence, the weights spatially applied to the signals from nodes 66 and 70 received by node 68 are the same because the loss in signal strength is the same. As previously mentioned this effectively means that there are fewer controllable weights (i weights versus i times j weights) between processing elements, i.e. this approach is more one dimensional than two dimensional. This limitation in the weights also limits the representational capability, which can be circumvented by using a large number of processing elements. The problems with the regular array approach are that this arrangement has a great deal of unneeded redundancy and the weighting scheme is nearly one dimensional. What is desired is less redundancy and a weighting scheme which is more two dimensional than one dimensional. The invention takes advantage of the physics of electromagnetic communication to increase the dimensionality of the weighted connections. To accomplish this, the array of transceiver antennas 60–76 must not be regular as illustrated in FIG. 3. By placing the transceiver antennas in a homogeneous pattern that is nearly randomly distributed, each processing element or node would have a unique pattern of weights (spatial loses) applied to the input signal received at that node. The actual placement of receiver antennas is a complex mathematical [np-complete] problem much like the "traveling salesman problem". Instead of optimizing a path among cities so that a minimum path is traversed, this problem chooses the placement of transceiver antennas, so that every distance between any two transceiver antennas is different with the constraint that this set of distances has a uniform distribution. This problem is solvable by those of ordinary skill in the art familiar with such problems. This encoding of the weight information by a combination of randomized numbers and output weights is more two dimensional than one dimensional which makes the neural network of the present invention more powerful, i.e. requiring less processing elements to perform any desired representation. Because of these differences in distances between transceivers, the weights, $w_{ij}$, are nearly two dimensional and one can legitimately replace $w_i/(d_j-d_i)$ in equation (2) with the quantity $w_{ij}$. This means that the Maxwell neural network algorithm with spatially encoded weights effectively becomes $$Y_j = \left( \sum_i w_{ij} x_i > \theta_j \right) \quad (4)$$

where $a_{ij} = 1/(d_j-d_i)$ and $w_{ij} = a_{ij} w_i$. Equation (4) is the expression for neural processing used in conventional neural networks. During the use of the present invention, given that the antenna locations are randomly located as described above, after the weights for solving a particular problem have been determined off line, for example, after the weights for a particular image recognition problem have been determined, the problem becomes selection of processing elements (antennas) that provide the desired weights between processing elements. Another problem which is complex but solvable by those of ordinary skill in the art.

Figure 6:
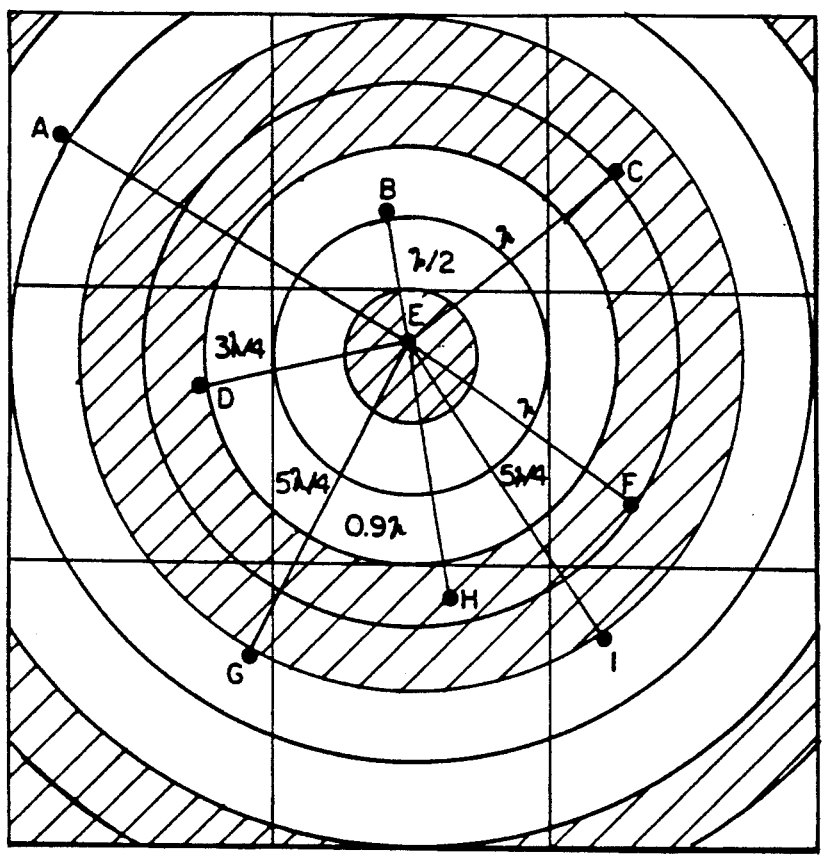
FIG. 6 is a diagram showing polarity regions around a processing elements' receiver antenna.

Not only are the magnitudes of the weights adjustable by appropriate placement of the receiving antenna with respect to the transmitting antennas, but when the antennas are broadcasting at the same frequency and same phase the polarity of the signal being combined is also controllable. This is illustrated in FIG. 6 where hatched regions are regions where the polarity of the signal received by the processing element E is positive and the white regions are regions where the polarity of the signal received by processing element E is negative. For example, the signal received at processing element E from processing element B is negative while the signal received at processing element E from processing element C is positive. The weight calculations for a transmitter receiver arrangement as illustrated in FIG. 6 in a point source free space planar arrangement is governed by:

$$E_\theta = 15 \pi I_o \sum_i \frac{A_i}{r_i} \sin\left( \omega t + \frac{2\pi r_i}{\lambda} + \phi_i \right) \quad (5)$$

$$w_i i_i = 15 \pi I_o A_i \quad (6)$$
$$\phi_i = 0 \quad (7)$$

where $I_o$ is a reference current, $A_i$ is amplitude, $r_i$ is the distance between transmitters and receivers, $\lambda$ is the wavelength, $\theta_i$ is the phase, and $\omega$ is the angular frequency. Applying equations 5, 6 and 7 to the antennas as illustrated in FIG. 6 would result in electric field values in accordance with:

$$E = -1 \frac{w_a i_a}{6\lambda/4} - 1 \frac{w_b i_b}{\lambda/2} + \frac{w_c i_c}{\lambda} + 0 \frac{w_d i_d}{3\lambda/4} + \quad (8)$$

$$\frac{w_f i_f}{\lambda} + 0 \frac{w_g i_g}{5\lambda/4} + \cos(1.8\pi) \frac{w_h i_h}{0.9\lambda} + 0 \frac{w_i i_i}{5\lambda/4}$$

$$E = -0.667 \frac{w_a i_a}{\lambda} - 2 \frac{w_b i_b}{\lambda} + \frac{w_c i_c}{\lambda} + \frac{w_f i_f}{\lambda} + 0.899 \frac{w_h i_h}{\lambda} \quad (9)$$

Although equations 5–7 apply to point sources in a free space planar field, these equations can be adapted by those of ordinary skill in the electromagnetic field propagation art to apply to dipole antennas arranged above a planar ground, to dipoles provided in a waveguide or an arbitrarily shaped wave containing chamber and to antennas in a waveguide or chamber of a more complex configuration, such as directional horns. These types of equations must be taken into account when determining the locations and weights available in the learning phase.

Figure 7:
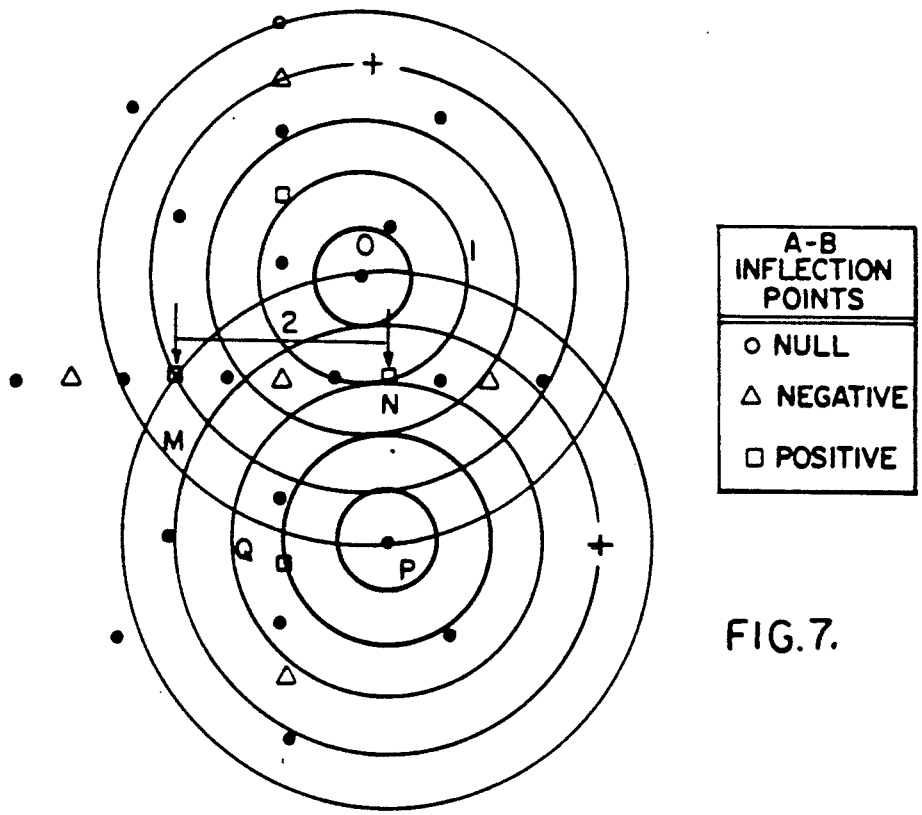
FIG. 7 illustrates how processing element antenna position selection can effect neural processing element weights.

An example of how the weights applied to signals received at a particular receiver can be adjusted can also be illustrated with respect to FIG. 7. That is, FIG. 7 shows how different weights can be selected by selecting different processing locations. FIG. 7 shows transmitter receiver antennas for processing elements M-Q in a point source free space planar field. Consider first the M, N, 0 triplet of antennas. Antennas M and N are one wavelength apart and 0 is one wavelength from M and ½ a wavelength from N. M receives a positively reinforced wave from both N and O, N receives a wave which is the difference of the O and M waves and O receives a wave which is the difference of the N and M waves. On the other hand, if M, N and P processing elements are chosen as an interacting configuration, P is ⅜ of a wavelength from N and 5/4 of a wavelength from M, M receives only information from N regardless of the amplitude of P, N receives only information from M regardless of the amplitude of P and P receives nothing regardless of the amplitudes of M and N. A configuration which results in positive reinforcement is the M, N and Q configuration. In this configuration M, N and Q are one wavelength apart, M receives a positively reinforced wave from both N and Q, N receives a positively reinforced wave from both M and Q and Q receives a positively reinforced wave from both M and N.

Figure 8:
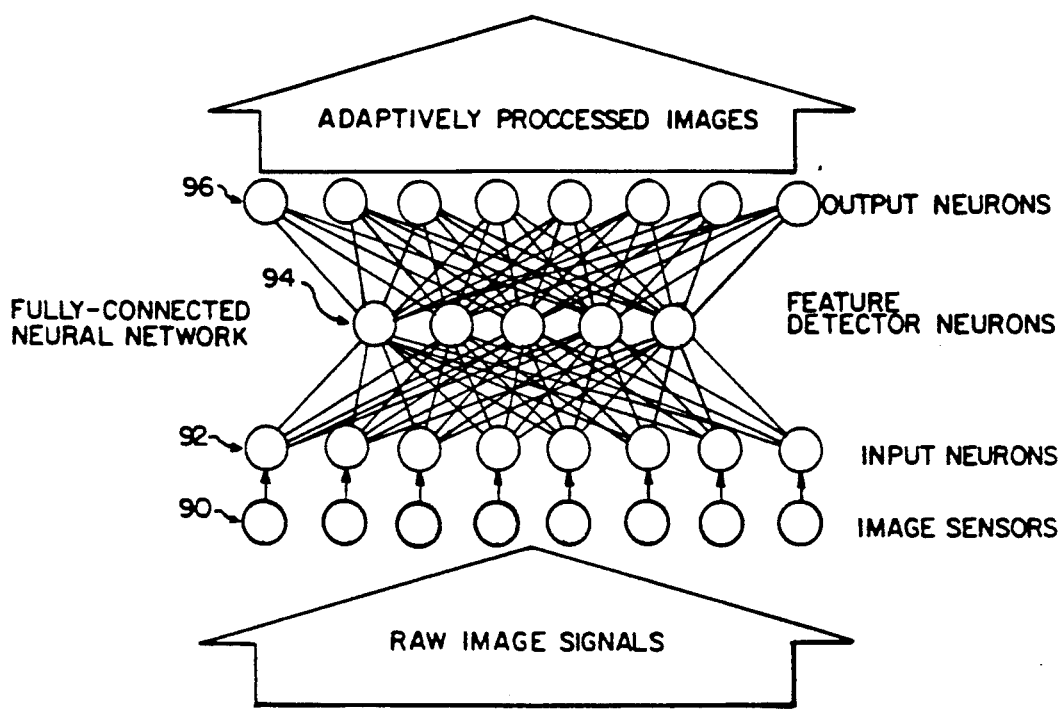
FIG. 8 depicts a layered processing element arrangement which would typically be used with the present invention.

Although it is possible to have all the processing elements in a network broadcast (transmit) to a single receiver processing element at a time, it is preferable for efficiency purposes to divide the processing elements in a network into groups or layers, which establish simultaneous unidirectional communication between layers, as illustrated in FIG. 8. Preferably in this latter arrangement approximately one-half the active processing elements receive while the other half transmits. These layers may not actually be physically separate layers but instead groupings of processing elements that broadcast or receive at the same time. All the processing elements (antennas for the neurons) of FIG. 8 may actually broadcast in the same waveguide (See FIG. 15) or the processing elements may actually broadcast and receive in separate waveguides (See FIG. 18), thereby defining actual separate physical layers of processing elements. FIG. 8 also illustrates a typical arrangement of layers for a typical neural network processing operation such as image recognition. As shown in FIG. 8, image sensors 90 provide input signals to input processing elements 92. The input elements 92 broadcast to all of the feature detector elements 94, thereby providing a fully connected network between the input elements and the feature detector elements 94. Once the feature detector elements have performed the appropriate processing, they broadcast to all of the output elements 96, thereby providing a fully connected neural network. It is also possible that the input elements 92 and the output elements 96 are the same devices, that is they can be reused during neural network processing. In such a situation, if the transceiver antennas are arranged in a planar waveguide, such that the input, feature detector and output neuron antennas are in the same waveguide, then during a first phase, the input elements 92 are transmitting while the feature detector elements 94 are receiving, and during a second phase, the feature detector elements 94 are outputting while the reused elements 92 are receiving. This alternate transmission and reception by different elements in the same waveguide (which could be called ping ponging) allows a large group of elements to communicate simultaneously to another large group of neurons, thereby providing a very high number of interconnects and a very high processing speed. Other processing sequences include hopscotching, where the signals bypass some elements, cascading where elements are activated in wave like arrangements, and overlapped group transmissions, for example a first set of elements transmits to a second set, the second set transmits to a third set, which is a subset of the first set, and the third set transmits to a fourth set which intersects the first and second sets but not the third set.

Figure 9:
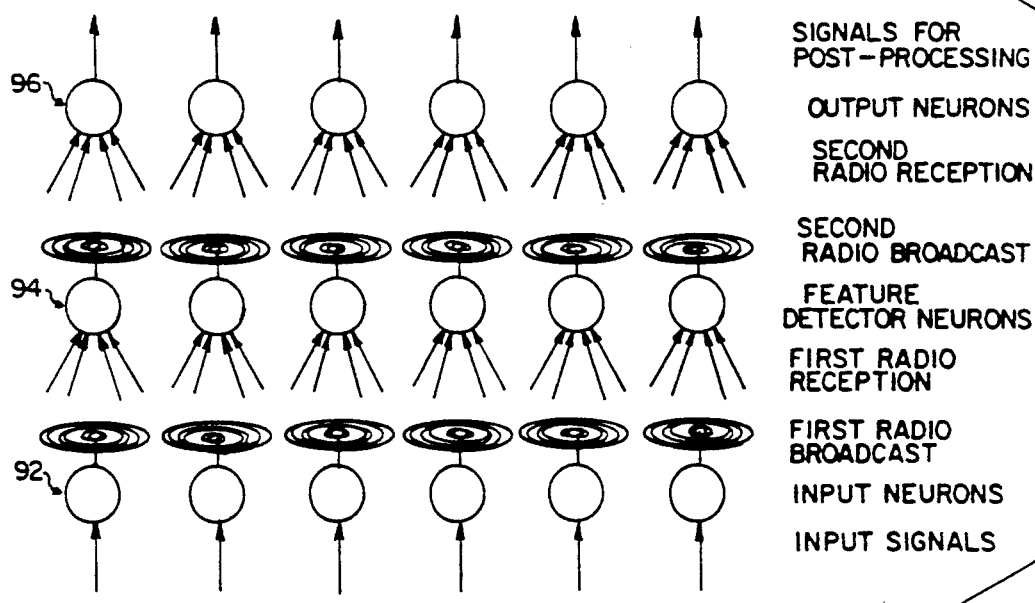
FIG. 9 is a diagram showing broadcast cycles in accordance with the use shown in FIG. 8.

The cyclic broadcast associated with the network shown in FIG. 8 is illustrated in FIG. 9. The cycles involve an input cycle in which input signals are input into elements 92, a first broadcast cycle in which the elements 92 broadcast to all of the feature elements 94, a second broadcast cycle in which elements 94 broadcast to output neurons 96 and an output cycle in which elements 96 output the computational results.

Figure 10:
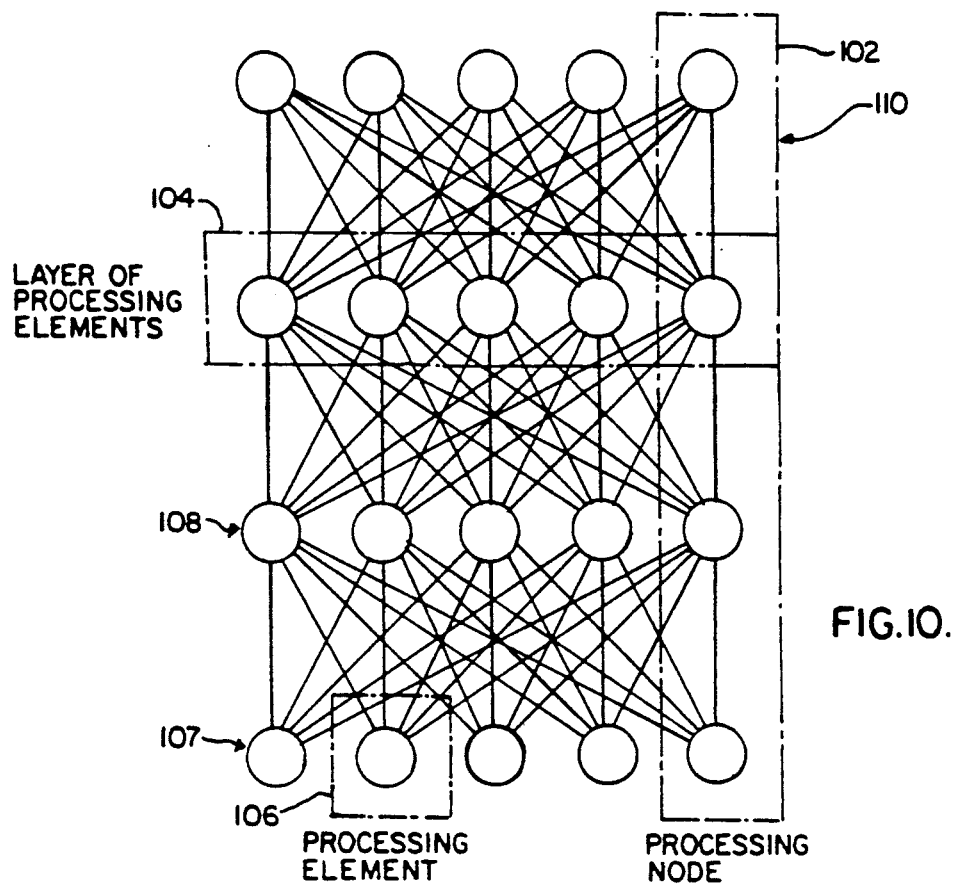
FIG. 10 illustrates a rectangular layer arrangement.
Figure 11:
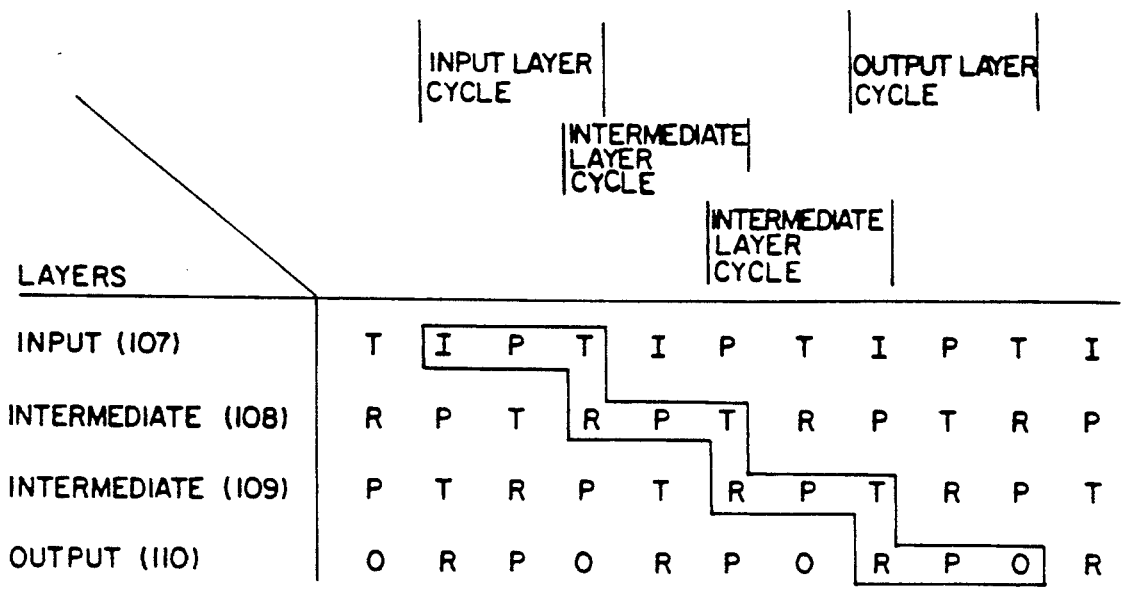
FIG. 11 illustrates the processing cycles of the arrangement of FIG. 10.
Figure 12:
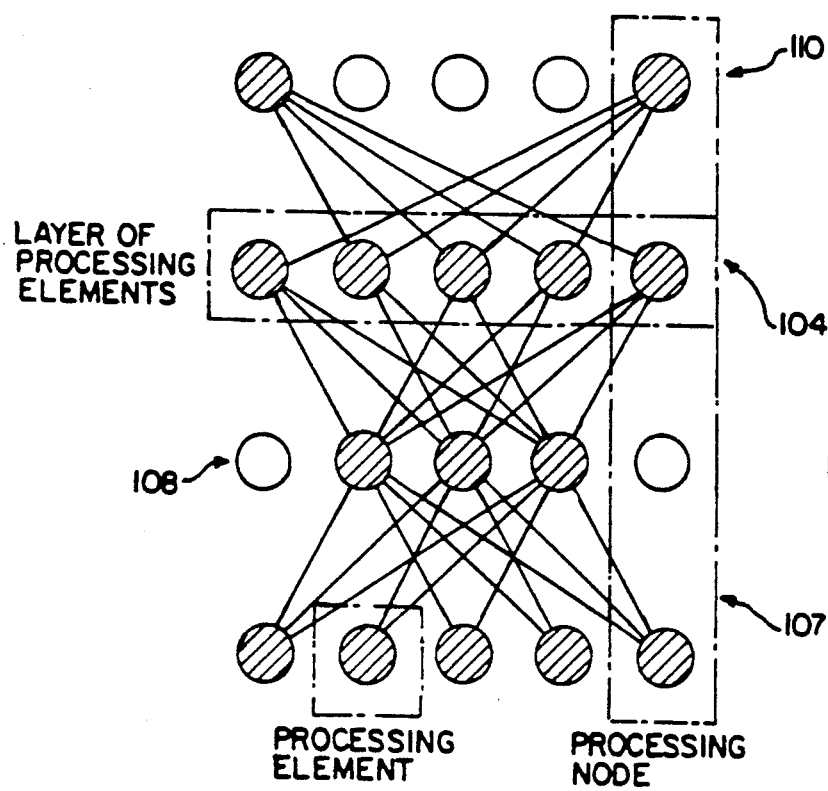
FIG. 12 depicts the layer structure of FIG. 10 used in a 5 by 3 by 5 by 2 network.

The selection of some of the processing elements to be transmitting processing elements while some of the processing elements are receiving processing elements, allows a purely parallel processing neural network system to be constructed as illustrated in FIG. 10. FIG. 10 illustrates a structure in which there are the same number of processing elements in each layer of the neural network. Note once again the antennas for these processing elements or neurons can be in the same waveguide. This rectangular configuration 100 allows the definition of a column 102 as a processing node, a row 104 as a layer and a neuron 106 as a processing element. In a processing cycle each of the processing elements in the network of FIG. 10 is in a different phase of the processing cycle as illustrated in FIG. 11. In FIG. 11, T stands for transmit, R for receive, I for input, P for sigmoid process and 0 for output. As can be seen from FIG. 11 while the input layer 107 is in the first phase (inputting from an external source) of its cycle the intermediate layer 108 is in the second phase (sigmoid processing) and the. intermediate layer 104 is in the third phase (transmitting). The output layer 110 is in the equivalent phase (receiving) as the input layer 107. Note that the input layer 107, input phase (I) does not conflict with the receiving phase (R) of the output layer 110 because the input is from an external source and the receiving by layer 110 is within the waveguide. Nor does the output layer 110 output phase (O) conflict with the input layer 107 transmission phase (T) because the transmission is within the waveguide and the output is to external destination. This arrangement allows the phases I, P, T, R and O to occur in parallel, that is, they overlap operations. However, it takes four processing cycles for the input values to affect the output. FIG. 12 illustrates the same configuration of processing elements shown in FIG. 10 implementing a parallel processing 5×3×5×2 network. Once again this can be groups of processing elements broadcasting and receiving in the same waveguide in different cycles as illustrated in FIG. 11. In this configuration, intermediate layer 108 has two processing elements that are never activated and the output layer 110 has three processing elements which are never activated.

In this architecture, all processing elements simultaneously transmit to a receiving processing element, making communications within the neural network layers global rather than local. To simplify the communications in such an architecture, the receiving processing element does not communicate with itself or with any element in the same column of the network (allowing allocation of resources based on temporal requirements). In this communications scheme, only $(N^2-N)$ connections are used to connect two layers of N elements (as compared with $N^2$ connections for the network of FIG. 10). Thus in a "serial processing" application, the inter-layer communications period must be divided into N separate receiving regions, each sub-period being dedicated to a specific receiving element. This approach leads to near fully-connected, multi-layered architectures that can be practically implemented for extremely large numbers of neural processing elements per layer.

Figure 13:
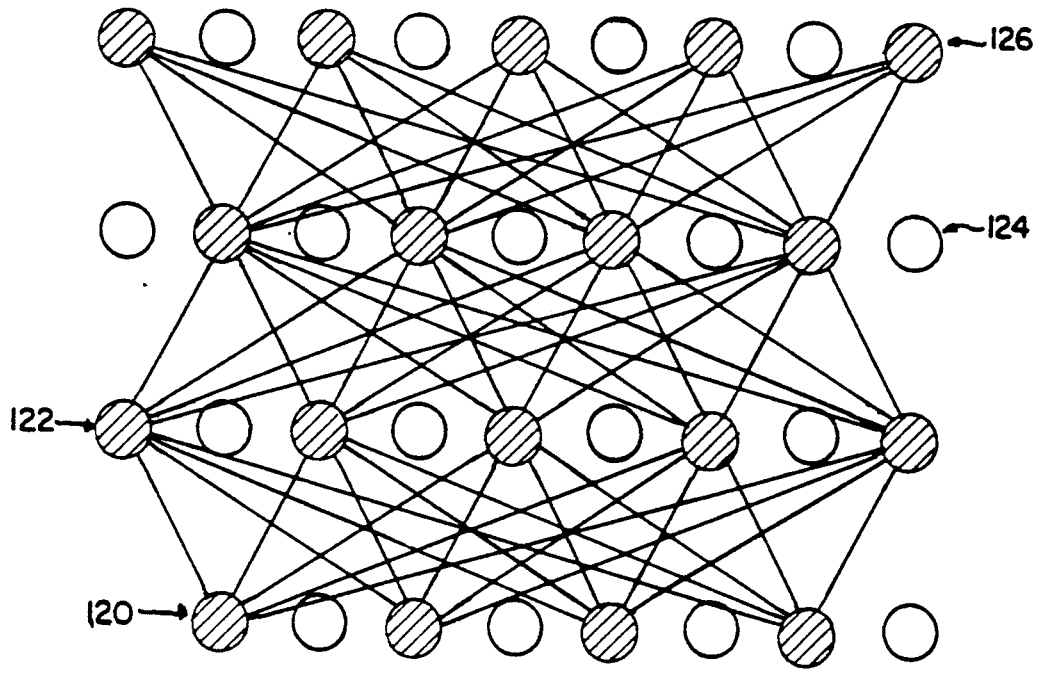
FIG. 13 depicts a fully connected 4 by 5 by 4 by 5 network using a 36 element network or an 18 element network.

FIG. 13 illustrates a 4×5×4×5 fully connected neural network formed using a 9×9×9×9 neural network. 36 dedicated neural processing elements in a single waveguide can be configured in a parallel processing operation to obtain the network illustrated in FIG. 13. In the 36 dedicated processing element configuration situation, 4 or 5 of the processing elements in the network are processing at any one time and therefore the utilization factor is approximately 12%. The network can also be configured as an 18 dedicated processing element configuration. In the first cycle 4 processing elements of layer 124 receive, process and transmit. In the second cycle, overlapping the first cycle, 5 processing elements in layer 122 receive, process and transmit. In the third cycle 4 elements of layer 124 receive, process and transmit while in the fourth cycle 5 elements of layer 126 receive and process. This configuration results in a processing element utilization factor of approximately 25%.

It is possible for the network illustrated in FIG. 13 to be implemented using a single set of nine processing elements. In such a situation, during the first cycle, four of the processing elements would act as input processing elements as shown in layer 120. During this cycle, the remaining five processing elements would act as the intermediate layer processing elements 122 of FIG. 13. During the next cycle the five intermediate layer processing elements would transmit to the other four processing elements which would now act as the second layer of intermediate processing elements 124. During the next cycle the four processing elements of the second intermediate layer would transmit to the remaining five processing elements which are now acting as the processing elements of the output layer 126. Because in such a fixed spatial configuration network where the processing elements are being reused during cycles, the only weight changes which would be allowed would be changes in the output weights $W_j$ applied to the output signals $Y_j$, as illustrated in FIG. 1. As a result, each processing element would have to have the capability of storing and cycling between amongst four different output weights (two eights of zero and two non zero weights). The reuse of the processing elements in this manner by having approximately ½ of the processing elements in the network (antennas in the same waveguides) transmitting to the other half of the processing elements in the network and changing the output weights, requiring appropriate weight storage in each processing element, can continue for as many cycles as is necessary, thereby allowing the present invention to implement a network with an arbitrary number of layers and, as previously discussed, it can be shown that any arbitrary function can be performed if a sufficient number of layers are available in the network. A processing element utilization factor of approximately 50% is obtained in this approach.

Figure 14H:
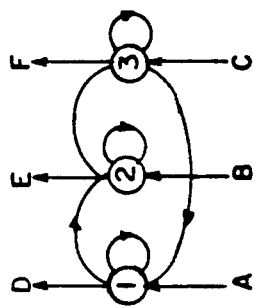
FIGS. 14(a)-14(p) illustrate how various combinations of recurrency and lateral connectivity can be obtained with the present invention.
Figure 14L:
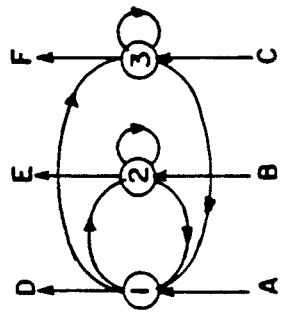
Figure 14P:
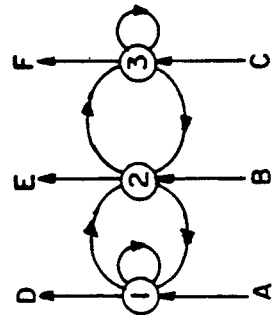
Figure 14G:
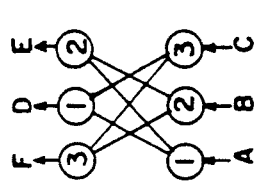
Figure 14K:
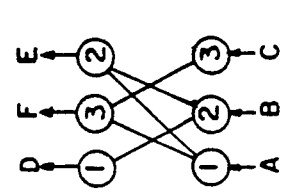
Figure 14O:
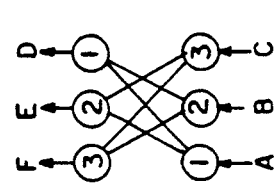
Figure 14F:
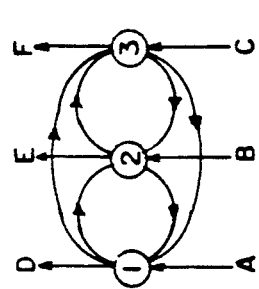
Figure 14J:
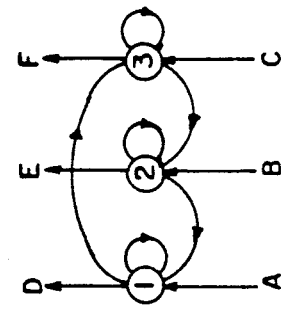
Figure 14N:
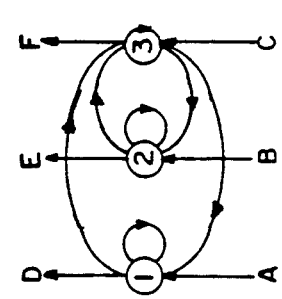
Figure 14E:
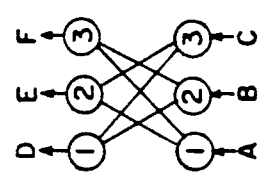
Figure 14I:
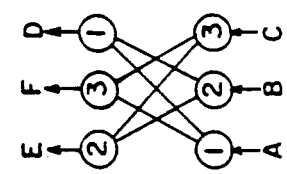
Figure 14M:
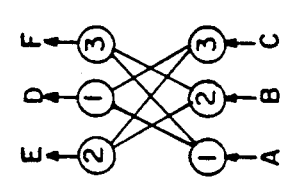
Figure 14D:
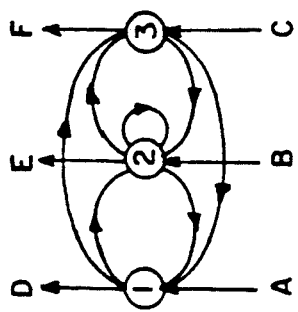
Figure 14C:
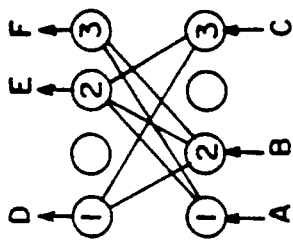
Figure 14B:
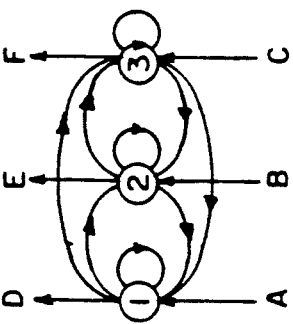
Figure 14A:
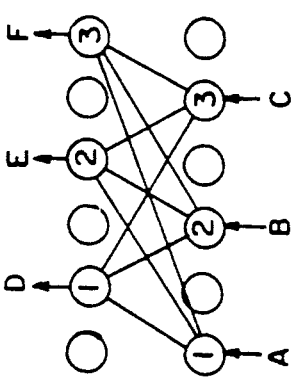

The feed forward networks previously discussed are powerful architectures. However, the present invention has the ability to implement various types of connection schemes as illustrated in FIGS. 14(a)-14(p). Various types of recurrency and connectivity are possible by using two consecutive layers to represent a single layer. Note the processing elements in different layers forming a single node have the same number in the circles representing the processing elements. For example, the network in FIG. 14(a) forms a single layer as illustrated in FIG. 14(b) which has full recurrency and full lateral connectivity. The network shown in FIG. 14(c) forms a layer as illustrated in FIG. 14(d) which includes partial recurrency and full lateral connectivity. FIG. 14(e) shows a network that forms a layer, as illustrated in FIG. 14(f), which has no recurrency and full lateral connectivity. FIG. 14(g) illustrates a network creating a layer as illustrated in FIG. 14(h) with full recurrency and partial lateral connectivity. FIGS. 14(i), 14(k), 14(m) and 14(o) form layers as respectively illustrated in FIGS. 14(j), 14(l), 14(n) and 14(p) which have other variations on partial recurrency and partial lateral connectivity. As can be seen from FIGS. 14(a)-14(p) the use of a processing element which communicates by radio waves can lead to a very flexible neural network computer.

Figure 15:
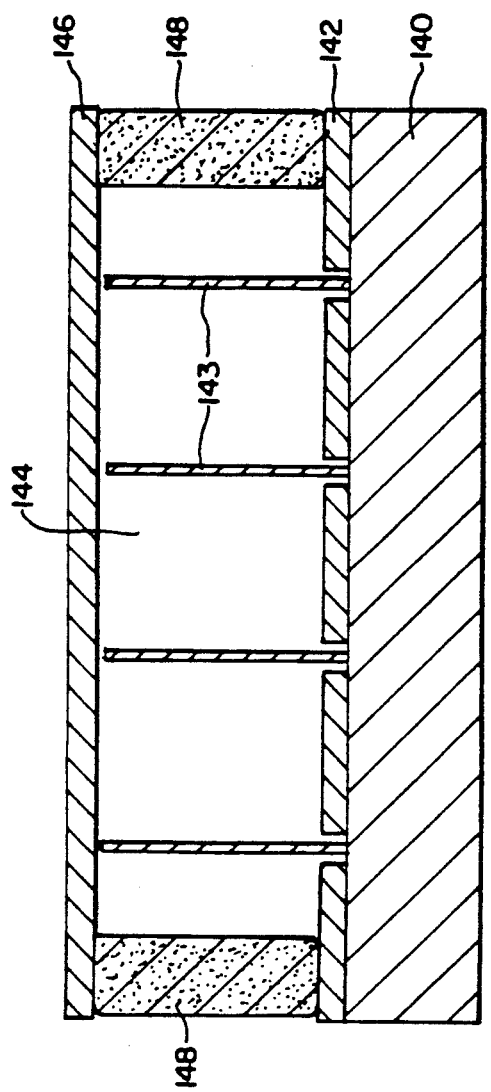
FIG. 15 depicts the construction of the present invention.

The waveguide and electronics used in the present invention are preferably constructed as illustrated in the side view of FIG. 15. The bottom 140 of the waveguide is a wafer scale integrated circuit which includes the analog electronics for the transmitters, receivers, amplifiers associated with the transmitters and receivers, and the neuron electronics associated with performing an analog sigmoid type transfer function. These antennas transmit and receive the common carrier signals for the transceivers. The antennas of the transmitters are preferably half dipole antennas 142 which protrude through a copper sheet 142 into a dielectric medium 144. In some applications the copper sheet could be replaced with a radio frequency absorbent material. A typical length for the half dipole antenna is $\lambda/4$ where $\lambda$ is the wavelength of the transmitted signal. At 100 GHz this would result in an antenna 0.25 millimeters long. The dielectric medium 144 can be designed to have desired attenuation characteristics such that some transmitter receiver pairs within the waveguide would not be able to communicate with each other. The top surface 146 of the waveguide is another sheet of copper. This copper sheet 146, if viewed from the top, is preferably the same shape as the copper sheet 142 and the same shape as the substrate of the wafer scale integrated circuit 140. For example, if the wafer scale integrated circuit is circular such as would be the case for a five inch diameter wafer, the copper sheets 146 and 147 would also be circular. Other shaped waveguides such as rectangular, octagonal, etc. are of course possible and the shape of the waveguide need not match the electronics wafer 140. The periphery of the waveguide is closed by a conventional radio frequency adsorbent material 148, such as that found in an anechoic chamber. In this configuration, the inputs to the system arrive through the wafer scale analog electronics 140 and the outputs are transmitted through the wafer scale electronics 140.

Figure 16:
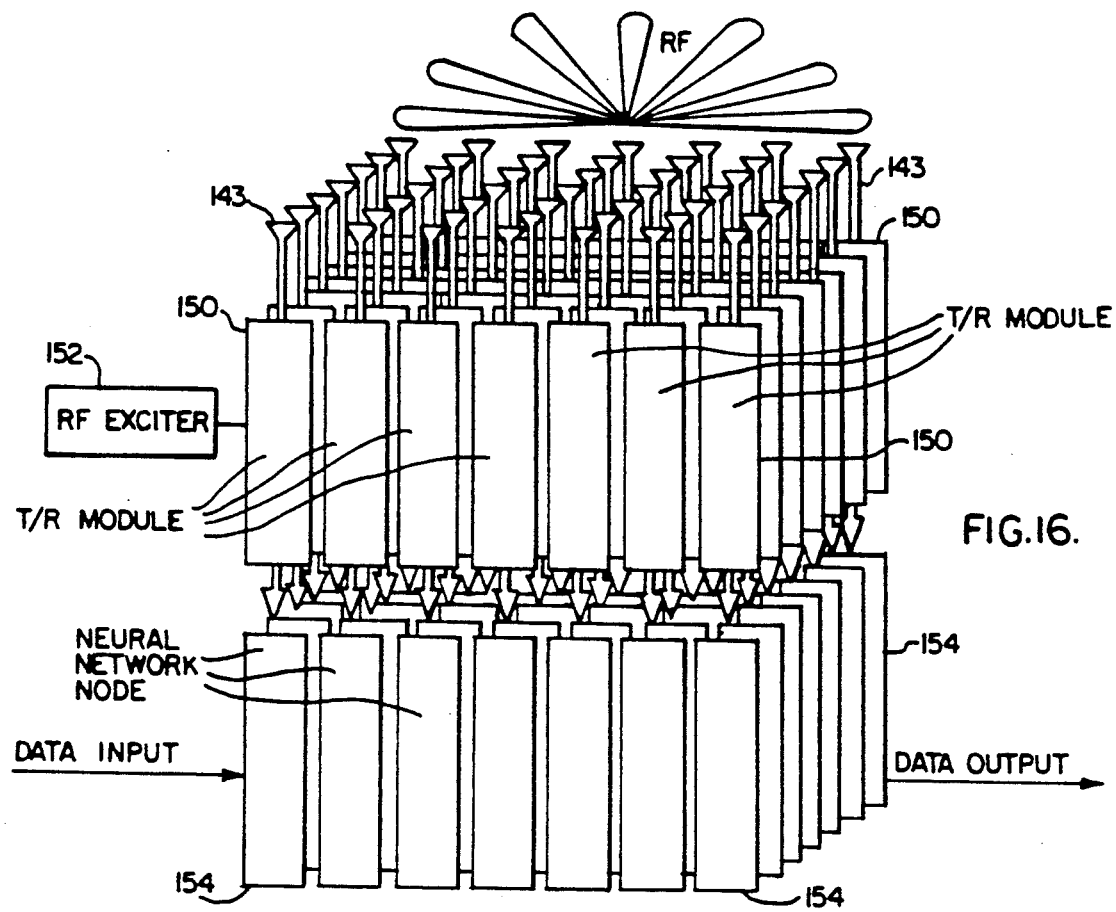
FIG. 16 illustrates the components of analog electronics layer 140 of FIG. 15.

FIG. 16 illustrates the arrangement of the analog electronics found in the analog electronics layer 140 illustrates in FIG. 15. Each antenna 143 is connected to a transmit/receive module (a transceiver) 150. The transmit/receive modules 150 are driven by a common radio frequency exciter 152, thereby allowing the transmitters to receive the same frequency drive signal, amplitude modified by the output produced by the neural node modules 154.

Figure 17:
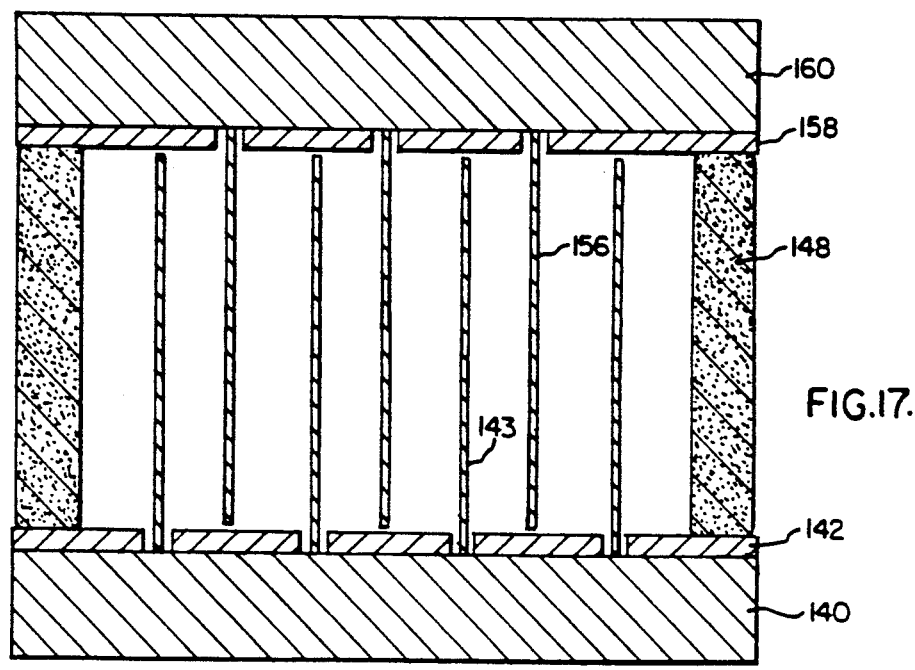
FIG. 17 is a diagram showing how sensors can be integrated into the device of FIG. 15.

FIG. 17 illustrates an alternate arrangement in which the input signals are supplied to the neural processing elements electromagnetically. In this arrangement the same analog wafer scale electronics layer 140, copper layer 142 and dipole antennas 143 are used. However, the radar absorbent periphery 148 is extended to allow dipole antennas 156 from the input sensors 160 to protrude through a copper sheet 158 which includes holes for the dipole antennas 156. In this situation the inputs from the sensor electronics 160 are transmitted by the dipole antennas 156 to the antennas 143 for the individual processing elements. The sensors electronics 160 could be, for example, digital image sensors with the appropriate converters and radio frequency amplifiers necessary to transmit into the waveguide signals proportional to the light level sensed. The outputs of the neural network in this embodiment, like that in FIG. 15, are output by the analog wafer scale electronics layer 140.

Figure 18:
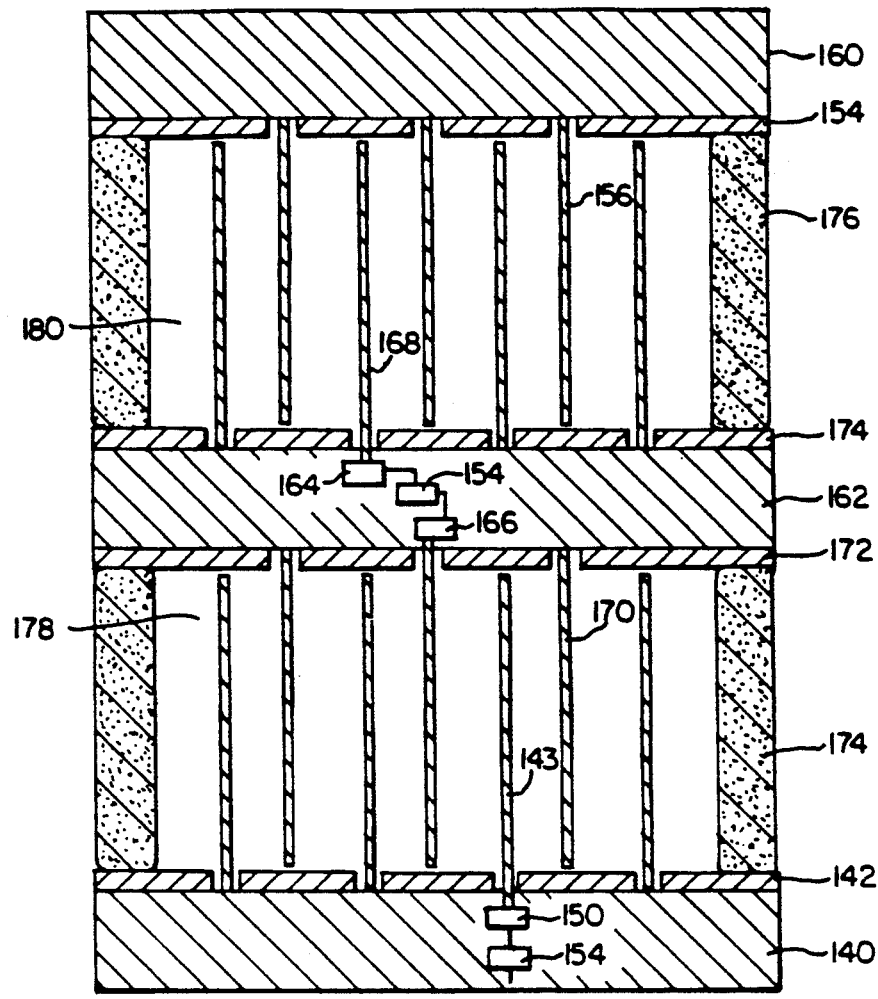
FIG. 18 shows a multilayer parallel processor.

FIG. 18 illustrates a further embodiment in which an intermediate analog electronics layer 162 which includes a receiver 164, a neural processing element 154 and a transmitter 166. In this embodiment the sensors 160 through the antennas 156 transmit sensor signals to antennas 168 where the analog electronics layer 162 provides a neural processing element transfer function operation and produces an output via antennas 170. The antennas 170 broadcast to the antennas 143 allowing the analog electronics 140 to perform the functions as previously discussed. This embodiment requires the addition of two punctured copper layers 172 and 174 along with appropriate radio frequency absorbent peripheral material 174 and 176 and the appropriate dielectric material 178 and 180.

Figure 19:
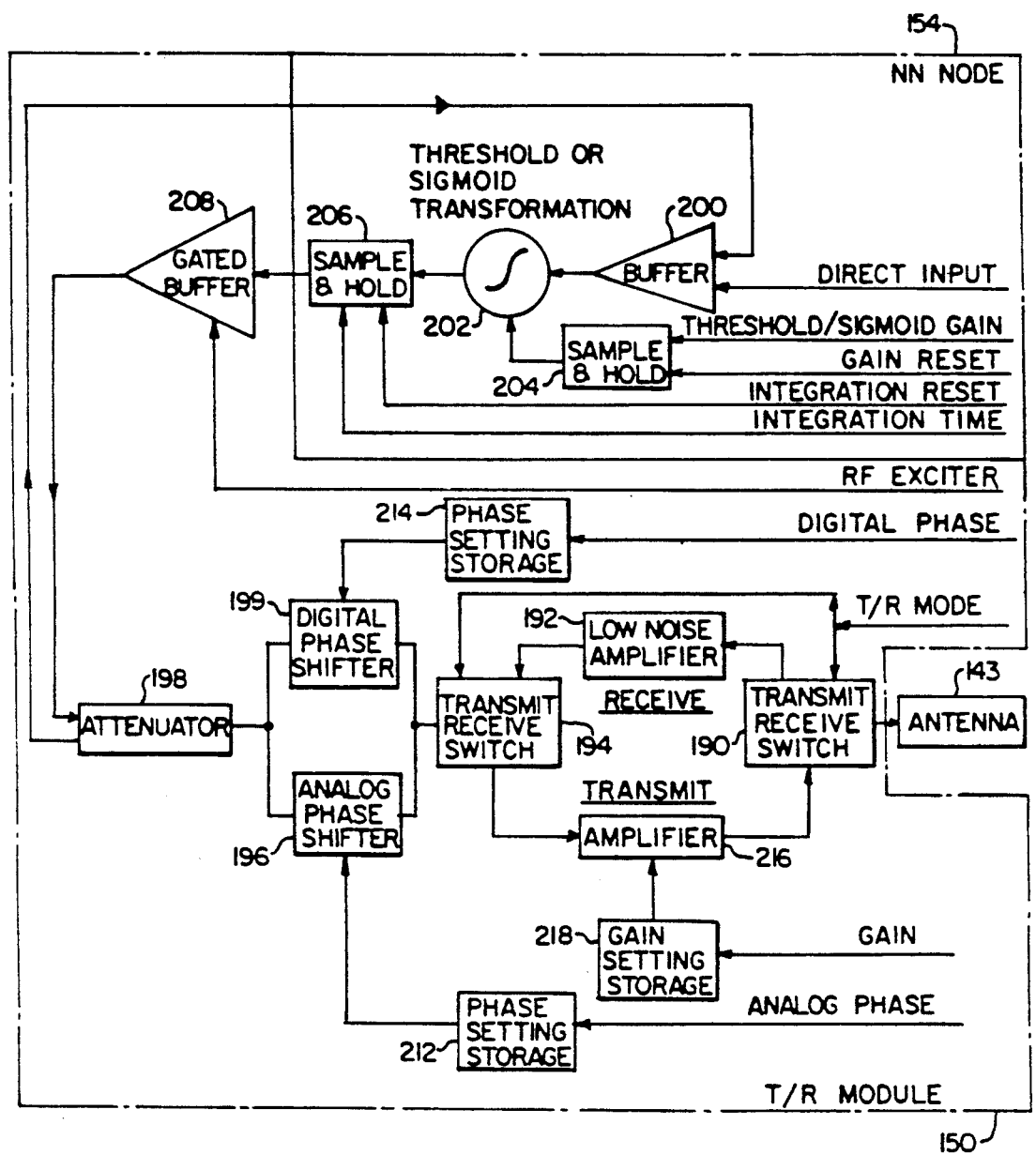
FIG. 19 depicts how components of the transceiver 150 module and processing element module 154 interact.

The transmitter/receiver module 150 and the neural processing element module 154 and the analog electronics layer 140 of FIG. 15 includes the components illustrated in FIG. 19. In this embodiment when antenna 143 receives a signal from other processing element, it is routed by a transmit receive switch 190, controlled by a transmit receive mode signal, to a low noise amplifier 192. The output of the low noise amplifier 192 is routed by a second transmit receive switch 194 through an analog phase shifter 196 which performs the desired phase shift and then through an attenuator 198. The digital phase shifter 199 acts as a backup to the analog shifter 196. The output of the attenuator 198 is stored as an analog value in a buffer 200 in the neural processing element module 154. The output from the buffer 200 is applied to a threshold or sigmoid transformation unit 202 which has its gain (crossover point) or threshold controlled by a sample and hold circuit 204 which stores the threshold value. The output of the unit 202 is stored by a sample and hold unit 206 and applied to a gated buffer 208. The output of the gated buffer 208 is controlled by an RF exciter signal from the RF exciter module 152. The output of the gated buffer 208 is applied to the attenuator 198. The output of the attenuator 198 is applied to the phase shifter 196. By providing a phase shift value stored in phase shift storage units 212 and 214 the present invention allows further control of the output weights applied to the output signal by the system in accordance with the outputs weights illustrated in FIG. 1. The phase shift also allows correctional adjustments to adjust for different distances of the transmitters from the common oscillator and for placement inaccuracies in the placement of the antennas. The output of the phase shifter is applied through the transmit receive switch 194 to a transmit amplifier 216. The transmit amplifier 216 has an adjustable gain which is controlled by a gain setting storage unit 218. The adjustable gain of the amplifier provides the weight adjustment on the output Yi of the neural processing element, as illustrated in FIG. 1. The gain setting capability also allows the system to be fault tolerant. If one or more transmitters are faulty, for example by constantly sending a signal, the signal sent by these transmitters can be considered noise and all the correctly functioning transmitters can produce a higher gain to adjust for the noise. Redundant processing elements in a sparse network can also be used for increased fault tolerance.

Figure 20:
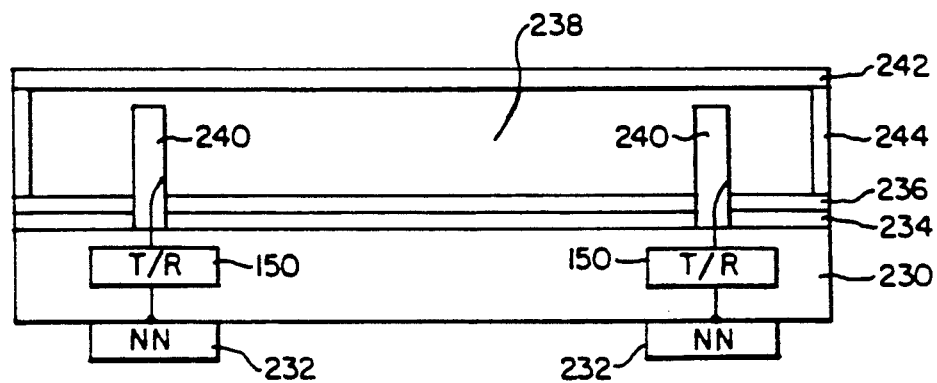
FIG. 20 illustrates a sixteen processing element network of conventional components.

An embodiment of the present invention including sixteen processing elements can be implemented using conventional components as illustrated in FIG. 20. The analog electronics layer 140 is divided into two basic components. A wafer scale radio frequency (9 GHz) array of transceivers 230 which is described in detail in U.S. Pat. No. 4,823,136, incorporated by reference herein. The sixteen transceivers of such an array are used to form a nine processing element network. The components of this patent which are used by the present invention are shown in FIG. 19 previously and discussed with respect to the transmit receive module 150. The neural node modules 154 of the analog electronics 140 can be provided by an Intel Corporation 80170NW neural node chip 232 which can be connected to the wafer 230 in a number of different ways. Sixteen of these chips are needed. It is preferable that the neural node chips be mounted as shown in FIG. 20. Each of the Intel chips includes 64 analog processing elements, however, as shown in FIG. 20, a chip functions as a single processing element and has a result only one pair the 64 inputs and outputs of each chip is used, the weights for other processing elements are set to zero, thereby only using only one of the 64 processing elements. The wafer scale transmitter receiver array 230 is designed to have applied thereto transmitter horns which are connected to the transceivers 150 by very small wires which extend above the surface of the wafer 230. An insulating silicon layer 234 is provided on the surface of the wafer through which the wires protrude. On the silicon layer 234, a copper layer 236 with appropriately aligned holes for the antenna wires is provided. To create the dipole antennas a solid silicon die or wafer 238 approximately the same size as the transmit/receive wafer 230 has holes 240 drilled therein. The depth of the holes is ¼ wavelength with respect to the transmit receive frequency of the wafer 230 which can be up to 18 gigahertz. The interior of the holes are coated with a conductor, such as copper, using a conventional process such as vapor deposition, thereby forming a tube of copper sealed on the upper end. The wire from the transmit/receive module 140 is attached to the interior surface of this cylinder thereby forming the ¼ wave antenna. A copper sheet 242 is attached to the upper surface of the silicon die 238 and a conventional radio frequency absorbent material 244 is applied to the periphery of the silicon die 238.

The processing speed, S, of a device such as discussed herein can be estimated in accordance with equations 10 and 11.

$$S_s = c \cdot I_s^{\frac{1}{3}} / [\beta(\alpha A)^{\frac{1}{2}} (L-1)^{\frac{2}{3}}] \qquad (10)$$

$$S_p = c \cdot I_p^{5/4} [4 \cdot \beta(\alpha A)^{\frac{1}{2}} (L-1)^{5/6/4}] \qquad (11)$$

where $\lambda = c/f$, $\lambda =$ wavelength (m), c = velocity of light ($\approx 3 \times 10^8$ m/s) and f = frequency (Hz), $N = \alpha A/d^2$, where N = the number of Processing Elements, $\alpha =$ fill factor ($\approx 0.8$), A = area of the wafer (m²), and d = processing element spacing ($\approx \lambda$) where $I_s = N*(N-1)*(L-1)$, $I_s =$ Serial Connections, and L = number of layers, and where $I_p = N^{2*} (L-1)/4$, $I_p =$ Parallel connections, $\beta =$ integration time (cycles)

which is preferably 10 to 100 cycles and $S_s$ is the serial processing limit while $S_p$ is the parallel processing limit. The processing speed for various size wafers at various operating frequencies is shown in tables 1–5 below. The serial processing mode is a mode where $N-1$ processing elements communicate to a single processing element and for each cycle a different processing element is chosen as the receiver. The parallel processing mode is characterized by one-half of the processing elements simultaneously communicating with the other half.

TABLE 1

Serial Processing Mode - Number of Connections

| Wafer Diameter (In) | 40 GHz | 160 GFHz | 300 GHz | 600 GHz |
|---|---|---|---|---|
| 2 | 2610 | 6.33 E5 | 7.87 E6 | 1.26 E8 |
| 3 | 10620 | 3.18 E6 | 3.97 E7 | 6.39 E8 |
| 4 | 35970 | 1.02 E7 | 1.26 E8 | 2.02 E9 |
| 5 | 96660 | 2.49 E7 | 3.08 E8 | 4.92 E9 |

TABLE 2

Serial Processing Mode Speed (Interconnects/s)

| Wafer Diameter (In) | 40 GHz | 160 GFHz | 300 GHz | 600 GHz |
|---|---|---|---|---|
| 2 | 1.16 E11 | 7.34 E12 | 4.86 E13 | 3.89 E14 |
| 3 | 2.36 E11 | 1.65 E13 | 1.09 E14 | 8.75 E14 |
| 4 | 4.36 E11 | 2.94 E13 | 1.94 E14 | 1.56 E15 |
| 5 | 7.16 E11 | 4.61 E13 | 3.04 E14 | 2.43 E15 |

TABLE 3

Parallel Processing Mode - Number of Connections

| Wafer Diameter (In) | 40 GHz | 160 GFHz | 300 GHz | 600 GHz |
|---|---|---|---|---|
| 2 | 675 | 1.59 E5 | 1.97 E6 | 3.15 E7 |
| 3 | 2700 | 7.96 E5 | 9.94 E6 | 1.60 E8 |
| 4 | 9075 | 2.54 E6 | 3.15 E7 | 5.05 E8 |
| 5 | 24300 | 6.22 E6 | 7.70 E7 | 1.23 E9 |

TABLE 4

Parallel Processing Mode Speed (Interconnects/s)

| Wafer Diameter (In) | 40 GHz | 160 GFHz | 300 GHz | 600 GHz |
|---|---|---|---|---|
| 2 | 9.00 E11 | 8.46 E14 | 1.97 E16 | 6.30 E17 |
| 3 | 3.60 E12 | 4.24 E15 | 9.94 E16 | 3.19 E18 |
| 4 | 1.21 E13 | 1.35 E16 | 3.15 E17 | 1.01 E19 |
| 5 | 3.24 E13 | 3.32 E16 | 7.70 E17 | 2.46 E19 |

TABLE 5

Number of Processing Elements

| Wafer Diameter (In) | 40 GHz | 160 GFHz | 300 GHz | 600 GHz |
|---|---|---|---|---|
| 2 | 30 | 460 | 1620 | 6480 |
| 3 | 60 | 1030 | 3640 | 14590 |
| 4 | 110 | 1840 | 6480 | 25940 |
| 5 | 180 | 2880 | 10130 | 40530 |

As can be seen from the above tables, the present invention provides a dramatically improved processing speed and number of available processing elements in a single unit over the conventional methods of implementing neural networks. The actual processing speeds that can be implemented are limited by the propagation delay in the electronic circuits. This invention allows us to make better use of the available processing power.

The present invention is primarily designed for solving pattern recognition problems, such as optical character recognition, in which, once the weights of the network are known, the weights of the system do not change. To implement such a fixed weight system, the weights are determined before the antennas and the processing elements are designated. Two approaches are possible for weight designation. In both approaches, the processing elements (and layers of processing elements) of the network, using an equation such as equation 3, are simulated in a conventional computer, to determine the $a_{ij}$ and $w_i$ terms. This simulation involves using a conventional back propagation learning algorithm with weight space constraints. Once the weights are determined the two approaches diverge. In a situation where the antenna positions are fixed (spatially randomly) beforehand, the computer must then select the antennas with the desired attenuation factors ($a_{ij}$) from the fixed positions available and select appropriate amplitudes ($w_i$) for the outputs of the processing elements. In the situation where the antennas are not fixed in position beforehand, the terms $a_{ij}$ are used to select antenna positions. In both cases the terms $w_i$ are used to fine tune the selection.

The invention has been described with respect to antennas placed in a relatively small waveguide, however, it is possible to have the antennas in an open room, in a large chamber or in a two or three dimensional maze of corridors. It is also possible to have antennas mounted on the sides of a three-dimensional waveguide which could be of various stages, from rectangular to maze like to polyhedron. This invention has also been described with respect to transceivers, but it is possible to implement the device with dedicated transmitter and receiver components which channel information flow through different antenna structures. It is also possible to focus the radio waves using horn like antennas or to steer a radio wave beam using antenna array, and then steering weights could be used to add another dimension of variability to the network. The invention has also been described with the analog electronics (transceivers and neuron circuits) tightly coupled in a small package, it is of course possible to separate the units physically such that the neurons are located away from the transceivers which are located away from the waveguide. Variations in the loss characteristics of the dielectric used in the waveguide along with the variations in the shape of the waveguide or insertion of reflecting material can also be used to vary weights between processing elements, thereby adding a further dimension to weight control allowing less layers to be used to solve difficult problems. Because sound waves propagate globally rather than locally, sound wave communication can be substituted for the radio wave communication. Light wave communication using a global broadcast is also possible. The invention has also been described with respect to a fixed weight network that does not learn once implemented. It is possible, if a sufficiently large number of unused processing elements on a wafer scale chip are available (a sparse network), to create an environment in which a learning algorithm is used to modify, in real time, antenna (processing element) selections allowing weights to be modified in real time providing an adaptive neural network. It is also possible to perform all the functions of a processing element digitally since analog-to-digital and digital-to-analog converters could easily be added to a chip or wafer at the antenna.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A neural network, comprising:
processing elements performing neural transfer function operations; and
a waveguide for simultaneously connecting said processing elements to each other.

2. A neural network, comprising:
processing elements performing neural transfer function operations on input signals; and
a waveguide for summing the input signals for the processing elements.

3. A neural network, comprising:
processing elements performing neural transfer function operations on input signals; and
waveguide means for weighting the input signals.

4. A neural processing element communicating with other processing elements, comprising:
a waveguide and an antenna positioned in said waveguide and wirelessly, simultaneously receiving and summing signals from the other processing elements; and
transfer function means for performing a neural transfer function on the summed signals.

5. A neural processing element as recited in claim 4, wherein the neural transfer function comprises a non-linear transfer function.

6. A neural processing element as recited in claim 4, wherein said waveguide comprises means for reflecting and/or absorbing radio waves.

7. A neural network, comprising:
wafer scale analog electronics including neurons connected to radio transceivers;
antennas connected to the transceivers; and
a waveguide surrounding said antennas.

8. A parallel processing neural network comprising:
first through fourth layers of neural processing elements each having a processing cycle with phases, the phases overlapping and the layers processing in parallel; and
radio wave means for communicating between said layers.

9. A neural processing element communicating with other processing elements through an adjacent waveguide, comprising:
an antenna projecting into the waveguide and receiving radio frequency signals from the other processing elements;
a transceiver connected to said antenna; and
a neural processing element transfer function unit connected to said transceiver.

10. A neural network, comprising:
a waveguide; and
neural network processing elements each for producing an output signal in said waveguide and each comprising:
summing means for wirelessly summing the output signals; and
transfer function means for performing a neural transfer function responsive to the summed output signals.

11. A network as recited in claim 10, wherein said processing elements are spatially separated, thereby applying spatially determined weights to the output signals.

12. A network recited in claim 11, wherein the spatial separation is irregular.

13. A network as recited in claim 10, further comprising means for applying a strength to an output of said transfer function means.

14. A neural network, comprising:
a waveguide;
antennas irregularly, spatially positioned in said waveguide;
transceivers corresponding to and connected to said antennas; and
neural processing element transfer function units corresponding to and connected to said transceivers.

15. A network as recited in claim 14, wherein said antennas, transceivers and units are divided into first and second groups and said first group transmits while said second group receives.

16. A method of performing neural network operations between first and second groups of neural processing elements, comprising the steps of:
(a) performing, by the first group, a first neural processing element transfer function to produce first neuron signals;
(b) radio frequency transmitting the first neuron signals;
(c) guiding the transmitted first neuron signals from the first group to the second group; and
(d) performing, by the second group, a second neural processing element transfer function on the first neuron signals.

17. A method as recited in claim 16, wherein step (c) is performed in a waveguide.

18. A method as recited in claim 16 further comprising the steps of:
(d) producing, by the second group, second neuron signals;
(e) radio frequency transmitting the second neuron signals from the second group to the first group; and
(f) performing, by the first group, a third neural processing element transfer function on the second neuron signals.

* * * * *